(12) United States Patent
Davidovits et al.

(10) Patent No.: US 8,202,362 B2
(45) Date of Patent: Jun. 19, 2012

(54) GEOPOLYMERIC CEMENT BASED ON FLY ASH AND HARMLESS TO USE

(75) Inventors: Joseph Davidovits, Saint-Quentin (FR); Ralph Davidovits, Saint-Quentin (FR); Marc Davidovits, Essigny le Grand (FR)

(73) Assignee: Red Lion Cement Technology Limited, Saint Vincent (VC)

( * ) Notice: Subject to any disclaimer, the term of this patent is extended or adjusted under 35 U.S.C. 154(b) by 458 days.

(21) Appl. No.: 12/374,912

(22) PCT Filed: Jul. 26, 2007

(86) PCT No.: PCT/FR2007/001285
§ 371 (c)(1),
(2), (4) Date: Jan. 23, 2009

(87) PCT Pub. No.: WO2008/012438
PCT Pub. Date: Jan. 31, 2008

(65) Prior Publication Data
US 2010/0010139 A1    Jan. 14, 2010

(30) Foreign Application Priority Data

Jul. 28, 2006  (FR) ...................................... 06 06923

(51) Int. Cl.
*C04B 12/04*    (2006.01)
(52) U.S. Cl. .................... 106/600; 106/705; 106/DIG. 1
(58) Field of Classification Search ................. 106/600, 106/705, DIG. 1
See application file for complete search history.

(56) References Cited

U.S. PATENT DOCUMENTS

| | | | | |
|---|---|---|---|---|
| 5,820,668 | A * | 10/1998 | Comrie | 106/600 |
| 7,294,193 | B2 * | 11/2007 | Comrie | 106/707 |
| 7,846,250 | B2 * | 12/2010 | Barlet-Gouedard et al. | 106/600 |
| 7,883,576 | B2 * | 2/2011 | Comrie | 106/600 |
| 2008/0028994 | A1 * | 2/2008 | Barlet-Gouedard et al. | 106/811 |

OTHER PUBLICATIONS

"Effect of Curing temperature and silicate concentartion on fly ash based geopolymerization", Sindhunata et al., Industrial and Engineering Chemistry Research (2006), 45(10), 3559-3568. Abstract only.*

* cited by examiner

*Primary Examiner* — Paul Marcantoni
(74) *Attorney, Agent, or Firm* — Browdy and Neimark, PLLC

(57) ABSTRACT

Geopolymeric cement based on aluminosilicate fly ashes of class F, which, contrary to the prior art, are harmless to use and harden at ambient temperature, favoring their use in common applications in the construction and civil engineering fields. This harmlessness is achieved thanks to a mixture containing: 10 to 15 parts by weight of a non corrosive alkali metal silicate solution in which the $M_2O:SiO_2$ molar ratio is less than 0.78, preferably less than 0.69 and the $SiO_2:M_2O$ ratio greater than 1.28, preferably greater than 1.45, M denoting Na or K; added to this are 10 to 20 parts by weight of water and 5 to 15 parts by weight of blast furnace slag having a specific surface area less than 400 $m^2$/kg preferably less than 380 $m^2$/kg and 50 to 100 parts by weight of class F aluminosilicate fly ash.

10 Claims, No Drawings

GEOPOLYMERIC CEMENT BASED ON FLY ASH AND HARMLESS TO USE

The present invention relates to a new type of geopolymeric cement intended for construction. This cement is called geopolymeric cement because it contains geopolymer minerals, consisting of alkaline aluminosilicates, best known under the name of poly(sialate), poly(sialate-siloxo) and/or poly(sialate-disiloxo). In the case of this invention, the geopolymeric cement is based on aluminosilicate fly ashes produced during the combustion of coal in electrical power plants. It hardens at room temperature.

FORMER TECHNIQUES

Two different types of cement may be distinguished: hydraulic cements and geopolymeric cements. Geopolymeric cements result from a mineral polycondensation reaction by alkaline activation, known as geosynthesis, in opposition to hydraulic traditional binders in which hardening is the result of a hydration of calcium aluminates and calcium silicates.

The poly(sialate) term was adopted to indicate the aluminosilicates geopolymers. The sialate network consists of $SiO_4$ and $AlO_4$ tetrahedrons alternatively bound by oxygen atoms. Cations (Na+, K+, Ca++, $H_3O$+) present in the structural cavities of the poly(sialate) balance the negative charge of $Al^{3+}$ in coordination (IV). The empirical formula of Polysialates is: $Mn\{—(SiO_2)z-AlO_2\}n, wH_2O$, with M representing the cation K, Na or Ca and "n" the degree of polymerization; "z" is equal to 1, 2, 3 or more, until 32. The three-dimensional network (3D) geopolymers are of type:

| | | |
|---|---|---|
| Poly(sialate) Mn—(—Si—O—Al—O—)n | M-PS | Si:Al = 1:1 |
| Poly(sialate-siloxo) Mn—(Si—O—Al—O—Si—O—)n | M-PSS | Si:Al = 2:1 |
| Poly(sialate-disiloxo) Mn—(Si—O—Al—O—Si—O—Si—O—)n | M-PSDS | Si:Al = 3:1 |

The geopolymeric binders or cements of the types poly(sialate), poly(sialate-siloxo) and/or poly(sialate-disiloxo), were the subject of several patents highlighting their particular properties. One can quote for example the French patents: FR 2.489.290, 2.489.291, 2.528.818, 2.621.260, 2.659.319, 2.669.918, 2.758.323 and 2.839.970.

Geopolymeric cements of the prior art, WO 92/04298, WO 92/04299, WO 95/13995, WO 98/31644, WO 03/099738, are the result of a polycondensation between three distinct mineral reagents, i.e.:
a) aluminosilicate oxide $(Si_2O_5, Al_2O_2)$ or metakaolin, obtained by the calcination of kaolin clay at 750° C. In this patent it is named MK-750.
b) sodium or potassium silicate with a molar ratio $M_2O:SiO_2$ comprised between 0.5 and 0.8, which corresponds to the molar ratio $SiO_2:M_2O$ in the range of 1.25 to 2, M being either Na or K. Because in the prior art both molar ratios are used indifferently, we are writing both ratios in this invention.
c) calcium disilicate $Ca(H_3SiO_4)_2$
d) sometimes, amorphous silica (silica fume) or natural aluminosilicates (ground rocks of diverse origins) are added to the mix. One can quote for example the French patents FR 2.758.323 and 2.839.970. These are reactive fillers embedded in the geopolymeric matrix that is the result of the reaction between the reagents a)+b)+c).

With potassium disilicate, molar ratio $M_2O:SiO_2=0.5$, $K_2(H_3SiO_4)_2$, polycondensation is the result of the following chemical reaction:

$$2(Si_2O_5, Al_2O_2)+K_2(H_3SiO_4)_2+Ca(H_3SiO_4)_2 \rightarrow (K_2O, CaO)(8SiO_2, 2Al_2O_3, nH_2O) \quad (1)$$

The obtained geopolymer is of the type (K, Ca)-Poly(sialate-siloxo), (K, Ca)-PSS with Si:Al=2. With a molar ratio $M_2O:SiO_2=0.8$, one obtains the (K, Ca)-Poly(sialate-disiloxo), (K, Ca)-PSDS.

The reagents a) and b) are industrial reactive products added in the reactive medium. On the other hand, the ingredient c), calcium disilicate, occurs in a naissant state, in situ, in strong alkaline medium. It results in general from the chemical reaction between calcium silicate such as calcium mellilite present in blast furnace slag.

One of the interesting properties of geopolymeric cements is that during their manufacture they release very little of the greenhouse gas, carbon dioxide $CO_2$, whereas cements containing Portland cement clinker emit a great deal of carbon dioxide. As one can read in the publication entitled *Global Warming Impact on the Cement and Aggregates Industries*, published in *World Resource Review*, Vol. 6, NR 2, pp 263-278, 1994, one ton of Portland cement releases 1 ton of gas $CO_2$, whereas geopolymeric cement releases 5 to 10 times less. In other words, within the framework of the international laws and protocols limiting future $CO_2$ emissions, a cement manufacturer initially producing Portland cement will be able to produce 5 to 10 times more geopolymeric cement, while emitting the same quantity of $CO_2$. The appeal of geopolymeric cements is very obvious for the economies of the developing countries.

Another way in making geopolymeric cement is the use of fly ashes, a by-product of coal power plants. There are various types of fly ashes containing more or less calcium, either combined as CaO in the silico-aluminate matrix or present as free lime. In general terms fly ashes generated by the combustion of coal (anthracite) have less lime and are named class F fly ash, or silico-aluminous (aluminosilicate). Those fly ashes resulting from the combustion of lignite are rich in lime and are named class C, or high-calcium, sulfo-calcium fly ashes. An indication of the chemical composition for both fly ash types is given in Table 1. In this invention, the geopolymeric cement is essentially made from class F aluminosilicate fly ashes, with CaO values less than 8% by weight, preferably less than 4%.

In the present invention, the fly ashes are produced in boilers where the temperature is usually above 1000° C. These types of fly ash are made of amorphous (glass) spheres. The fly ashes obtained at lower temperature like in fluidized bed, around 750-1000° C., do not pertain to the frame of this invention. These later fly ash types are not vitrified and some of them may contain silico-aluminate species very close to the metakaolin MK-750 described hereafter. This later type of fly ash belongs to the geopolymeric cements of the prior art, such as outlined in the French patent FR 2,758,323, page 6, lines 15-18.

TABLE 1 chemical composition, carbon deducted, of fly ashes (after
A. Jarrige, Les cendres volantes, propriétés -
applications industrielles, ed. Eyrolles, Paris 1971)

|  | Coal fly ashes (class F) silico-aluminous | Lignite fly ashes(class C) sulfo-calcium |
|---|---|---|
| $SiO_2$ | 47.2 à 54 | 18 à 24.8 |
| $Al_2O_3$ | 27.7 à 34.9 | 12.1 à 14.9 |
| $Fe_2O_3$ | 3.6 à 11.5 | 6.3 à 7.8 |
| CaO | 1.3 à 4.1 | 42.9 à 49 |
| including free lime | 0.1 | 18 à 25 |
| MgO | 1.4 à 2.5 | 1.9 à 2.8 |
| $SO_3$ | 0.1 à 0.9 | 5.5 à 9.1 |
| $Na_2O$ | 0.2 à 1.6 | 0.5 à 2 |
| $K_2O$ | 0.7 à 5.7 | 1 à 3 |

The prior art provides several references on the use of fly ashes. In general terms the authors describe some alkali-activation or chemical activation, as in the Silvestrim patent U.S. Pat. No. 5,601,643 (WO 96/25369). However, in recent time, these type of cements are coined geopolymer cements or geopolymeric cements, as the Davidovits patents of the prior art. See for example the Skvara patent "Geopolymer binder based on fly ash", WO 03/078349, or the Nicholson patent "Geopolymers and methods for their production", WO 2005/019130.

Table 2 provides details on patents from the prior art that contain fly ashes as major of secondary element. The presence of the reactive ingredients in the recipe is indicated by (XX) and their absence by (–), namely:
- MK-750, calcined kaolin or aluminosilicate oxide ($Si_2O_5$, $Al_2O_2$),
- blast furnace slag,
- class C or F fly ash,
- alkali silicate with the ratios $M_2O:SiO_2$ and $SiO_2:M_2O$, M being K or Na,
- geopolymerization temperature (setting): room temperature (20° C.) or in oven (20-95° C.),
- setting time in hours in the oven,
- the use of reactive activator,
- harmless to use.

CaO are ordered "corrosive". Any geopolymeric formula that behaves like any one of the hydraulic binders, i.e. "irritant", may be termed "harmless to use". NaOH and KOH, ordered as "corrosive", may not be used in regular building and civil engineering applications. Any sodium and potassium alkali silicates with molar ratios $M_2O:SiO_2$ greater than 0.69 and $SiO_2:M_2O$, less than 1.45, M being K or Na, belongs to the category "corrosive". A geopolymeric reactant mixture with a molar ratio $M_2O:SiO_2$ less than 0.69 and $SiO_2:M_2O$, greater than 1.45, is ordered "irritant". The corresponding geopolymeric cement behaves like a traditional hydraulic binder. In the present invention, this geopolymeric cement is said to be "harmless to use". It has also been observed that, because of the presence of silico-aluminates in geopolymeric cements, a geopolymeric mixture with a molar ratio $M_2O:SiO_2$ comprised between 0.69 and 0.78 and $SiO_2:M_2O$, comprised between 1.28 and 1.45, is not corrosive. This is probably due to the action of a protective colloidal layer. In that precise case, the geopolymeric mix is said to be "partially harmless to use". To sum up:
- harmless to use when $M_2O:SiO_2<0.69$ and $SiO_2:M_2O>1.45$
- partially harmless when $0.69<M_2O:SiO_2<0.78$ and $1.28<SiO_2:M_2O<1.45$ In Table 2, the property "harmless to use" for geopolymeric cements of the prior art is indicated by "yes", or by "no" if it is corrosive.

In the prior art, the oldest geopolymeric patents containing fly ash are the Heizmann patents U.S. Pat. Nos. 4,642,137 and 4,640,715. They describe a powder mix added to ordinary Portland cement. The powdered potassium silicate is the industrial product $K_2O.3SiO_2.3H_2O$, with molar ratio $K_2O:SiO_2=3.0$ and $SiO_2:M_2O=0.33$, greater than 1.45. Its alkalinity is not high enough to generate any geopolymerization. Therefore, it is mixed with solid potash KOH flake that is dangerous and corrosive. Both patents contain MK-750 and in their examples the final ratio results from the mix of potassium silicate with KOH and provides $K_2O:SiO_2$ greater than 1.0 and $SiO_2:M_2O$ less than 1.0. This cement is ordered "corrosive". It is not harmless to use.

TABLE 2

Comparison between prior art and present invention.

|  | Present invention | WO 03/099738 | WO 2005/019130 | U.S. Pat. No. 5,084,102 | U.S. Pat. No. 4,642,137 | CZ 289735 | WO 03/078349 | WO 96/25369 |
|---|---|---|---|---|---|---|---|---|
| MK-750 | — | XX | XX | — | XX | XX | — | — |
| slag | XX | XX | XX | XX | XX | XX | — | — |
| Fly ash silicate | XX (F) | — | XX (C, F)) | XX (F) | XX (C, F) | XX | XX (C) | XX (F) |
| $M_2O:SiO_2$ | 0.5-0.69 | 0.5-0.80 | 3.22 | 0.83-1.2 | 0.33 | 1.0-2.5 | 1.0-1.66 | 1.0-5.0 |
| $SiO_2:M_2O$ | 1.45-2.0 | 1.25-2.0 | 0.31 | 0.8-1.20 | 3.0 | 0.4-1.0 | 0.6-1.0 | 0.2-1.0 |
| Temp. ° C. | 20° C. | 20° C. | 90° C. | 20° C. | 20° C. | 60-70° C. | 20-95° C. | 60-90° C. |
| time | — | — | 12-18 h | — | — | 8-12 h | 8-12 h | 15-60 h |
| activator | — | — | Borax | clinker | KOH + clinker | clinker | Ca++ | — |
| harmless | YES | YES + partial | NO | NO | NO | NO | NO | NO |

Definition of the Term "Farmless in Use"

According to their aggressiveness to human skin, chemical products are ordered in three categories:
- non irritant
- irritant
- corrosive or toxic.

The traditional hydraulic binders, Portland cement, blast furnace slag and hydrated lime, belong to the category "irritant". Caustic soda NaOH, caustic potash KOH, quick lime Brouns Seratius patent U.S. Pat. No. 5,084,102 describes a powdered mix involving class F fly ash, very fine blast furnace slag with a specific surface area in the range of 500-650 $m^2/kg$, and sodium metasilicate in powder, $Na_2O.SiO_2.5H_2O$, the later being ordered in the category "corrosive". It also uses a setting activator, namely Portland cement clinker. The molar ratio $M_2O:SiO_2$ is close to 1.0 and $SiO_2:M_2O$ also close to 1.0. This cement is "corrosive". It is not harmless to use.

Silverstrim patent U.S. Pat. No. 5,601,643 (WO 96/25369) contains only class F fly ash mixed with alkali metal silicate and caustic soda NaOH. The geopolymerization temperature is in the range 60-90° C., for 15 hours. The molar ratio $M_2O:SiO_2$ is comprised between 1.0 and 5.0 and $SiO_2:M_2O$, comprised between 0.2 and 1.0. This cement is "corrosive". It is not harmless to use. Silverstrim patent contains a strange feature. It is mentioned in the text that this highly corrosive mix may be used for regular building and civil engineering operations. This is nonsense because the workers would have to use special clothing to protect them against any chemical aggression.

Skvara patent CZ 289,735 contains all mineral ingredients such as MK-750, blast furnace slag with a specific surface area in the range of 400-600 $m^2/kg$, class F fly ash, alkali metal silicate, and also Portland cement as activator. Setting occurs at 60-90° C. The molar ratio $M_2O:SiO_2$ is comprised between 1.0 and 2.5 and $SiO_2:M_2O$, comprised between 0.4 and 1.0. This cement is "corrosive". It is not harmless to use.

The other Skvara patent WO 03/078349, uses class C fly ashes, rich in free lime. In addition, the mix contains activators, essentially calcium salts, C++ cations found in $CaCO_3$, $CaSO_4$ and lime $Ca(OH)_2$, in order to enhance hardening at 60° C. for 8 hours. It does not contain blast furnace slag. In opposition to what is written in the claims with a ratio $M_2O:SiO_2$ in the range of 0.6 to 1.5, the examples describe alkali metal silicates with ratio $M_2O:SiO_2$ comprised between 1.0 and 1.66 and $SiO_2:M_2O$, comprised between 0.6 and 1.0. Here, as well as in the following patent WO 2005/019130. class C fly ashes contain free lime and need very high alkaline conditions in order to prevent any rapid setting, also called "flash set". This cement is "corrosive". It is not harmless to use.

Nicholson patent WO 2005/019130 is exclusively dealing with the use of class C fly ashes. It is well known that this type of lime rich fly ash sets rapidly, sometimes in the mixer. Boride salts, such as borax, are added in order to increase the pot life of the geopolymeric mix. Geopolymerization occurs at 90° C. for 16 hours. In the examples of the Nicholson patent the molar ratio $M_2O:SiO_2$ is equal to 3.2 and $SiO_2:M_2O$ equal to 0.31. This cement is "corrosive". It is not harmless to use.

There is no fly ash in Davidovits patent WO 03/099738 that describes the use of natural silico-aluminates, for example weathered granites. In the alkali metal silicate the molar ratio $M_2O:SiO_2$ is comprised between 0.5 and 0.8 and $SiO_2:M_2O$, comprised between 1.28 and 2.0. The geopolymer mix is "partially harmless in use" for ratios $0.69<M_2O:SiO_2<0.78$ and $1.28<SiO_2:M_2O<1.45$. For the ratio $M_2O:SiO_2<0.69$ and $SiO_2:M_2O>1.45$, this geopolymeric cement is ordered <<irritant>> and is harmless to use Fouché patent WO 93/16965 contains class F fly ash but is not listed in Table 2. The alkali reagents are produced in situ and result from the chemical reaction between $Na_2CO_3$ and lime $Ca(OH)_2$ with formation of caustic NaOH in aqueous solution. This chemical reaction is as old as Humanity. Then NaOH reacts with amorphous silica (silica fume) to produce alkali metal silicate. However, this chemical reaction is very slow at ambient temperature and requires several hours. This process results in a geopolymeric cement mixture that is extremely corrosive during handling, due to the formation of NaOH. It is not harmless to use.

BRIEF DESCRIPTION OF THE INVENTION

The principal object of the invention is the description of fly ash-based geopolymeric cements, which, in opposition to the prior art, are harmless to use allowing them to be used in regular building and civil engineering fields. The industrial interest of this invention becomes obvious when one adds the fact that their manufacture requires only 9 times less energy that for the production of Portland cement, and in addition it emits 8 to 10 times less global warming gas $CO_2$.

These geopolymer cements contain:
reagent (I): 10 to 15 parts by weight of alkali metal silicate solution containing 45% to 55% water, in which the molar ratio $M_2O:SiO_2$ is less than 0.78, preferably less than 0.69 and the ratio $SiO_2:M_2O$ greater than 1.28, preferably greater than 1.45, M representing Na or K.
and
reagent (II): 10 to 20 parts by weight of water
and
reagent (III): 5 to 15 parts by weight of blast furnace slag with a specific surface less than 400 $m^2/kg$ preferably less than 380 $m^2/kg$.
and
reagent (IV): 50 to 100 parts by weight of aluminosilicate class F fly ash, in which the CaO content is less than 8% by weight, preferably less than 3%.

Hardening of these geopolymer cements occurs at room temperature and the compressive strength at 28 days is in the range of 50 to 100 MPa.

In these class F aluminosilicate fly ash-based geopolymeric cements the weight ratio fly ash/alkali metal silicate solution is greater than 4. However, in the case of potassium silicate, this ratio fly ash/alkali metal silicate solution is greater than 5. The following examples show that this ratio depends on the type of fly ash used in the mix and may be greater than 6. This is of great advantage because it allows the use of potassium silicate, which according to the prior art provides better properties than those obtained with sodium silicate-based geopolymeric cement, at the same costs.

The molar ratio for all the geopolymer cement constituents is $M_2O:SiO_2$ comprised between 0.03 and 0.065 and $SiO_2:H_2O$ comprised between 20 and 45. The mixture contains a very high amount of water, which provides excellent fluidity without decreasing the mechanical properties. With potassium silicate the amount of water added to the mixture is also greater, yielding a molar ratio $SiO_2:H_2O$ greater than 30.

DESCRIPTION OF THE PREFERRED EMBODIMENTS

This new geopolymeric cement involves basically following reactive constituents:
The reagent (I) is a water soluble alkali metal silicate. It has been shown in the prior art, Davidovits patent EP 0 153 097, that said alkali metal silicate must have a molar ratio $M_2O:SiO_2$ close to 0.5 (M representing Na or K, or a mixture of Na and K), corresponding to the chemical formula $M_2O:2SiO_2,nH_2O$, n being comprised between 2 and 6. In the present invention, M is preferably K. Although potassium silicate is more expensive than sodium silicate, the properties of the cements produced with potassium silicate are much better than those obtained with sodium silicate. In the present invention, the molar ratio $M_2O:SiO_2$ is comprised between 0.5 and 0.78. In the following examples, the alkali metal silicate solution contains 20-30% by weight of $SiO_2$, 15-26% of $K_2O$ or $Na_2O$, and 45-55% by weight of water. The solution may be prepared in advance or may result from the dissolution of solid (powdered) alkali silicate present in the mix, with added water.

The reagent (III) is a basic calcium silicate, i.e. one having a Ca/Si atomic ratio equal to or greater than 1, such as wollastonite $Ca(SiO_3)$, gehlenite $(2CaO.Al_2O_3.SiO_2)$, akermanite $(2CaO.MgO.2SiO_2)$. When the particles of these substances come into contact with an alkaline solution (NaOH or KOH), very rapid desorption of CaO occurs, so that the Ca/Si atomic ratio becomes less than 1 and tends to 0.5. There is the production in situ of soluble calcium disilicate $Ca(H_3SiO_4)_2$ that participates to the geopolymeric reaction. Industrial by-products and high-temperature residues contain essentially the basic silicates gehlenite, akermanite and wollastonite, and are thus very suitable. They are found in blast furnace slag. Under the microscope, the hardened cements of the following examples show that the finer slag grains have disappeared. One only sees an imprint of their initial shape, in the form of a skin probably made up of akermanite, which did not react. This process is very regular and may be complete within 30 minutes. However, when the slag has a very fine grain size, say 400 $m^2$/kg or greater (this corresponds to a mean grain size $d_{50}$ of 10 microns), the hardening of geopolymer cement is too fast. Now, in the prior art, the blast furnace slag used has a specific surface area in the range of 400-600 $m^2$/kg, i.e. $d_{50}$ less than 10 microns, such as in the patent WO 98/31644. In addition to the patents already cited in Table 2, one may cite the Forss patents, which claimed the alkali activation of blast furnace slag. See for example the patent U.S. Pat. No. 4,306, 912. In these Forss patents, the specific surface area of the slag is greater than 400 $m^2$/kg, preferably comprised between 500 and 800 $m^2$/kg. This is not the case in the present invention where, preferably, one takes 5 to 15 parts by weight of blast furnace slag with a specific surface area less than 380 $m^2$/kg or $d_{50}$ between 15 and 25 microns. This enables to get mixtures with a pot-life ranging between 1 and 4 hours.

The reagent (IV) is aluminosilicate class F fly ash, in which the CaO content is less than 8% by weight, preferably less than 4%. The prior art was aimed at dissolving the fly ashes in order to get the individual reactive elements silica and alumina. This implied corrosive conditions in conjunction with temperature. The prior art added to the alkali metal silicates, sodium hydroxide NaOH and/or potassium hydroxide KOH, in great quantity. On the opposite, in the present invention, the fly ash particles would react only on their surface through a different chemical mechanism starting with the production of a geopolymeric matrix resulting from the chemical reaction between reagent (I) and reagent (III). This geopolymer matrix is chemically non corrosive and ordered "irritant". Yet it is sufficiently reactive to activate the surface of the fly ash particles, yielding a surface geopolymeric reaction. This enables to get a geopolymeric cement that is harmless to use.

The binders or cements of this invention are illustrated in the following examples. They have no limiting character on the scope of the invention as presented in the claims. All indicated parts are by weight.

EXAMPLE 1

The method used in our laboratory for the characterization of any fly ash type is based on its pH. It consists of diluting 5 g of powdered mineral in 50 ml of de-ionised water. One measures the pH value after 1 minute, 5 minutes. This method detects those materials that may generate flash-set (instant hardening) and be therefore inaccurate for a further usage, due to the presence of free lime of Ca sulfate. Based on our experience carried out with an alkali metal silicate solution with a ratio $M_2O:SiO_2=0.78$, the various fly ash types may be ordered as follows:

pH<8: no instant hardening danger. It is a class F fly ash.
8<pH<10: fast hardening, but no flash-set. It is a class C fly ash with low amount of free lime.
pH>10: possible flash-set. It is a class C fly ash with high amount of free lime.

One takes a fly ash from Thailand (Mae Moh). Its chemical composition is listed in Table 3. The CaO value is 10.0, and characterizes a class C fly ash. The pH value is 10.05. There is a risk of rapid hardening or flash-set.

TABLE 3

Chemical composition of fly ash from Thailand (Mae Moh).

| $SiO_2$ | $Al_2O_3$ | $Fe_2O_3$ | CaO | MgO | $SO_3$ | $Na_2O$ | $K_2O$ |
|---|---|---|---|---|---|---|---|
| 45.89 | 24.58 | 10.67 | 10.0 | 2.44 | 1.76 | 1.32 | 2.65 |

A mixture is prepared containing:
10 parts by weight of an alkali metal silicate solution with a ratio $K_2O:SiO_2=0.78$, containing 51% by weight of water.
10 parts by weight of water,
50 parts by weight of fly ash from Thailand.

The mixture is cast in a mold and one measures the setting time at room temperature. The mixture already hardens at 5 minutes. This fly ash cannot be used for the making of a geopolymeric cement according to the present invention.

EXAMPLE 2

One takes a fly ash from the Czech Republic (Opatovice). Its chemical composition is listed in Table 4. The CaO value is 2.24, and characterizes a class F fly ash. The pH value is 5.25. There is no risk of rapid hardening.

TABLE 4

Chemical composition of fly ash from the Czech Republic (Opatovice).

| $SiO_2$ | $Al_2O_3$ | $Fe_2O_3$ | CaO | MgO | $SO_3$ | $Na_2O$ | $K_2O$ |
|---|---|---|---|---|---|---|---|
| 52.94 | 33.08 | 6.27 | 2.24 | 0.93 | 0.25 | 0.25 | 1.75 |

A mixture is prepared containing:
10 parts by weight of an alkali metal silicate solution with a ratio $K_2O:SiO_2=0.78$, containing 51% by weight of water.
10 parts by weight of water,
50 parts by weight of fly ash from the Czech Republic.

The mixture is cast in a mold and one measures the setting time at room temperature. The mixture does not harden after 45 minutes. This fly ash can be used for the making of a geopolymeric cement according to the present invention.

The following mixture is prepared:
10 parts by weight of an alkali silicate solution with a ratio $K_2O:SiO_2=0.78$, containing 51% by weight of water.
10 parts by weight of water,
50 parts by weight of fly ash from the Czech Republic.
15 parts by weight of blast furnace slag with a specific surface of 390 $m^2$/kg.

The mixture is cast in molds that are closed and one let harden at room temperature. The compressive strength at 28 days is 70 MPa.

EXAMPLE 3

One takes a fly ash from Australia (Perth). Its chemical composition is listed in Table 5. The CaO value is 2.42, and characterizes a class F fly ash. The pH value is 5.05. There is no risk of rapid hardening.

TABLE 4

Chemical composition of fly ash from Australia (Perth, Collie Power).

| $SiO_2$ | $Al_2O_3$ | $Fe_2O_3$ | CaO | MgO | $SO_3$ | $Na_2O$ | $K_2O$ |
|---|---|---|---|---|---|---|---|
| 47.80 | 24.40 | 17.40 | 2.42 | 1.19 | 0.29 | 0.31 | 0.55 |

A mixture is prepared containing:
10 parts by weight of an alkali metal silicate solution with a ratio $K_2O:SiO_2=0.78$, containing 51% by weight of water.
10 parts by weight of water,
50 parts by weight of fly ash from Australia.

The mixture is cast in a mold and one measures the setting time at room temperature. The mixture does not harden after 45 minutes. This fly ash can be used for the making of a geopolymeric cement according to the present invention.

The following mixture is prepared:
10 parts by weight of an alkali silicate solution with a ratio $K_2O:SiO_2=0.78$, containing 51% by weight of water.
10 parts by weight of water,
60 parts by weight of fly ash from Australia.
15 parts by weight of blast furnace slag with a specific surface of 390 $m^2$/kg.

The mixture is cast in molds that are closed and one let harden at room temperature. The compressive strength at 28 days is 80 MPa.

This Australian fly ash is interesting, because it enables us to show the difference between the method of the prior art (see Table 2) and geopolymeric cements according to the present invention. Indeed, this ash was used by a research team at University of Technology Curtin, Perth, under the direction of V. J. Rangan, to make a complete study on the behavior of fly ash-based cement and the concretes thus obtained, according to the technique of the prior art.

The results were published in several scientific journals and presented thoroughly at the World Congress GEOPOLYMER 2005. One finds them in the form of 4 articles written in the book "Geopolymer, Green Chemistry and Sustainable Development solutions" published by the Geopolymer Institute, 02100 Saint-Quentin, France (www.geopolymer.org) pages: 133-137, 145-147, 149-152, 153-156. The tests were carried out under the following conditions:

The alkali metal silicate solution was prepared by adding caustic soda NaOH solutions, 8M, 12M and 14M. One obtains following molar ratios for the alkali silicates:

| NaOH | 8M | 12M | 14M |
|---|---|---|---|
| $Na_2O:SiO_2$ | 0.78 | 0.91 | 0.99 |
| $SiO_2:Na_2O$ | 1.28 | 1.08 | 1.01 |

The mechanical properties (compressive strength) depend on alkalinity and setting temperature carried out for 24 hours. Thus, one gets:

| | Temperature | | |
|---|---|---|---|
| $Na_2O:SiO_2$ | 30° C. | 60° C. | 90° C. |
| 0.78 | 20 MPa | 57 MPa | 65 MPa |
| 1.01 | 30 MPa | 70 MPa | 70 MPa |

The weight ratio fly ash/alkali metal silicate is equal to 2.83. The molar ratio $H_2O:Na_2O$ is equal to 10. A greater ratio, equal to 12.5, lowers the compressive strength from 70 MPa (at 90° C.) to 45 MPa (at 90° C.). The molar ratio $Na_2O:SiO_2$ involving all geopolymeric cement constituents is comprised between 0.097 and 0.11.

These experimental conditions, according to the prior art, are now compared with the ones of the present invention, taking as reference a compressive strength in the range of 70 to 80 MPa (see in Table 6).

TABLE 6

Comparison between the prior art and the present invention, compressive strength 70-80 MPa, same Australian fly ash.

| Silicate type | Prior art Sodium silicate | Example 3, present invention Potassium silicate |
|---|---|---|
| $M_2O:SiO_2$ | $Na_2O:SiO_2 = 0.99$ | $K_2O:SiO_2 = 0.78$ and 0.69 |
| $SiO_2:M_2O$ | $SiO_2:Na_2O = 1.01$ | $SiO_2:K_2O = 1.28$ and 1.45 |
| Harmless to use | No | Yes |
| Ratio ash:alkali silicate | 2.83 | 6.0 |
| Molar ratio $H_2O:M_2O$ | 10 | 35 à 40 |
| $M_2O:SiO_2$, all constituents | 0.097 à 0.11 | 0.043 à 0.055 |

One notices that in the prior art the ratio $M_2O:SiO_2$ of all constituents is 2 times greater than the one of the present invention. The prior art is using 2 times more alkali reagents $M_2O$ than in the present invention.

EXAMPLE 4

In the mixture of Example 3, potassium silicate is replaced by sodium silicate. With the addition of 30% more alkali silicate, the mixture still prevails its good properties, remaining harmless to use, because the alkali metal silicate ratio $M_2O:SiO_2$ is still equal to 0.78 or 0.69. The ratio ash:alkali silicate deceases from 6.0 to 4.6 and the molar ratio $H_2O:M_2O$ decreases from 40 to 28. The ratio $M_2O:SiO_2$ of all constituents increases from 0.043 to 0.060. yet is still lower than the values listed for the prior art in Table 6.

EXAMPLE 5

The following mixture is prepared:
13.5 parts by weight of an alkali metal silicate solution with a ratio $K_2O:SiO_2=0.54$, containing 55% by weight of water.
10 parts by weight of water,
60 parts by weight of fly ash from Australia.
15 parts by weight of blast furnace slag with a specific surface of 390 $m^2$/kg.

The mixture is cast in molds that are closed and one let harden at room temperature. The compressive strength at 28 days is 70 MPa.

The geopolymeric cement is ordered "irritant" and is harmless to use.

According to the experimental conditions and the use of Na silicate or K silicate, the quantity of slag can vary from 5 to 15 parts by weight and the relationship between the quantity of fly ashes and the quantity of alkaline metal silicate solution is greater than 4. However, when the alkaline silicate is potassium silicate, this relationship between the quantity of fly ashes and the quantity of alkaline silicate solution is greater than 5. This ratio varies with the fly ash types, and has values equal to 6 or greater. This represents a great advantage, because it allows the use of potassium silicate, which according to the former art, generates cements having properties quite better than those of cements obtained with sodium silicate, at equivalent economic costs.

In the geopolymeric cement and for all constituents, the oxides molar ratio $M_2O:SiO_2$ is ranging between 0.03 and 0.065 and $H_2O:M_2O$ ranging between 20 and 45. The presence of a great quantity of water in the mixture ensures for an excellent fluidity of the mix, without decreasing the mechanical properties. Here also, like previously, the use of potassium silicate allows to employ more water in the mixture, leading to a molar ratio $H_2O:K_2O$ greater than 30.

It is interesting to compare the energy needs as well as the greenhouse gas $CO_2$ emissions of traditional Portland cements vis a vis the geopolymeric cement obtained according to the present invention Energy need, in MJ/Tonne

| type | calcination | crushing | total |
|---|---|---|---|
| Portland | 3200 | 430 | 3430 |
| geopolymeric | 200 | 190 | 390 |

Global Warming Gas Emission, $CO_2$, in Tone/Tonne

| Portland | 1.00 |
|---|---|
| geopolymeric | 0.05–0.10 |

The production of aluminosilicate class F fly ash-based geopolymeric cement require 9 times less energy than that of Portland cement. It generates 8 to 10 times less $CO_2$. In contrary to the prior art, fly ash-based geopolymeric cements are harmless to use allowing them to be used in regular building and civil engineering fields. The industrial interest of this invention becomes obvious.

Naturally, various modifications can be introduced to geopolymeric cements described above, by workers in the field, while remaining within the terms of the invention.

The invention claimed is:

1. A geopolymeric cement based on class F fly ash, wherein the class F fly ash has a CaO value less than 8% by weight, said geopolymeric cement is harmless to use,
contains an aqueous alkali metal silicate in which the molar ratio $M_2O:SiO_2$ is less than 0.78,
the ratio $SiO_2:M_2O$ is greater than 1.28, M representing Na or K,
said geopolymeric cement hardening at room temperature.

2. The geopolymeric cement according to claim 1), wherein said alkali metal silicate has the $M_2O:SiO_2$ molar ratio less than 0.69, and the $SiO_2:M_2O$ ratio greater than 1.45, said geopolymeric cement being harmless to use.

3. The geopolymeric cement according to claim 1) or claim 2), wherein it is made of:

a) 10 to 15 parts by weight of alkali metal silicate solution containing 45% to 55% water, in which the $M_2O:SiO_2$ molar ratio is less than 0.78, optionally less than 0.69 and the $SiO_2:M_2O$ ratio greater than 1.28, optionally greater than 1.45, M denoting Na or K
and
b) 10 to 20 parts by weight of water
and
c) 5 to 15 parts by weight of blast furnace slag with a specific surface area less than 400 $m^2$/kg optionally less than 380 $m^2$/kg
and
d) 50 to 100 parts by weight of aluminosilicate class F fly ash, in which the CaO content is less than 8% by weight, optionally less than 4%.

4. The geopolymeric cement according to claim 3), wherein the quantity of fly ash is more than four times greater than the quantity of said alkali metal silicate solution.

5. The geopolymeric cement according to claim 3), wherein said alkali metal silicate is potassium silicate and the quantity of fly ash is more than five times the quantity of alkali metal silicate solution.

6. The geopolymeric cement according to claim 3), wherein for all constituents, the oxides molar ratio
$M_2O:SiO_2$ is ranging between 0.03 and 0.065
and
$H_2O:M_2O$ ranging between 20 and 45.

7. The geopolymeric cement according to claim 6), wherein the alkali metal silicate is potassium silicate and the $H_2O:M_2O$ molar ratio greater than 30.

8. The geopolymeric cement of claim 3,
wherein the molar ratio of $M_2O:SiO_2$ is less than 0.69; the molar ratio of $SiO_2:M_2O$ is greater than 1.45; the blast furnace slag has a specific surface area less than 380 $m^2$/kg; and the CaO content of the aluminosilicate class F fly ash is less than 4% by weight.

9. A geopolymeric cement based on class F fly ash, free of Portland cement,
said geopolymeric cement being harmless to use and containing an aqueous alkali metal silicate, said geopolymeric cement hardening at room temperature, said geopolymeric cement being made of:
a) 10 to 15 parts by weight of said alkali metal silicate solution containing 45% to 55% water, in which the $M_2O:SiO_2$ molar ratio is less than 0.78, and the $SiO_2:M_2O$ ratio is greater than 1.28, M denoting Na or K,
b) 10 to 20 parts by weight of water,
c) 5 to 15 parts by weight of blast furnace slag with a specific surface area less than 400 $m^2$/kg, and
d) 50 to 100 parts by weight of aluminosilicate class F fly ash, in which the CaO content is less than 8% by weight.

10. The geopolymeric cement of claim 9,
wherein the $M_2O:SiO_2$ ratio is less than 6.9, the $SiO_2:M_2O$ ratio is greater than 1.45, the blast furnace slag specific surface area is less than 380 $m^2$/kg, and the CaO content of the fly ash is less than 4% by weight.

* * * * *

UNITED STATES PATENT AND TRADEMARK OFFICE
CERTIFICATE OF CORRECTION

PATENT NO.         : 8,202,362 B2
APPLICATION NO.    : 12/374912
DATED              : June 19, 2012
INVENTOR(S)        : Joseph Davidovits et al.

It is certified that error appears in the above-identified patent and that said Letters Patent is hereby corrected as shown below:

In the Claims

Claim 10, column 12, line 53, delete "6.9" and insert --.69--.

Signed and Sealed this
Twenty-second Day of April, 2014

Michelle K. Lee
*Deputy Director of the United States Patent and Trademark Office*